(12) United States Patent
Kim et al.

(10) Patent No.: US 7,655,361 B2
(45) Date of Patent: Feb. 2, 2010

(54) ELECTROLYTE FOR HIGH VOLTAGE LITHIUM RECHARGEABLE BATTERY AND HIGH VOLTAGE LITHIUM RECHARGEABLE BATTERY EMPLOYING THE SAME

(75) Inventors: Yongshik Kim, Yongin-si (KR); Jinbum Kim, Yongin-si (KR); Jinsung Kim, Yongin-si (KR); Narae Park, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/834,200

(22) Filed: Aug. 6, 2007

(65) Prior Publication Data
US 2008/0090153 A1 Apr. 17, 2008

(30) Foreign Application Priority Data
Oct. 17, 2006 (KR) .................. 10-2006-0100962

(51) Int. Cl.
*H01M 6/16* (2006.01)
*H01M 6/04* (2006.01)

(52) U.S. Cl. .................. 429/332; 429/200; 429/326; 429/341

(58) Field of Classification Search .................. None
See application file for complete search history.

(56) References Cited

U.S. PATENT DOCUMENTS

| | | | |
|---|---|---|---|
| 5,709,968 A | 1/1998 | Shimizu | |
| 6,444,261 B1 | 9/2002 | Plaksine et al. | |
| 6,632,572 B1 | 10/2003 | Takahashi et al. | |
| 2004/0106039 A1* | 6/2004 | Arai et al. | 429/199 |
| 2005/0014072 A1* | 1/2005 | Yamaguchi et al. | 429/329 |
| 2006/0078792 A1 | 4/2006 | Kim et al. | |

FOREIGN PATENT DOCUMENTS

| | | |
|---|---|---|
| CN | 1207810 | 2/1999 |
| CN | 1755976 | 4/2006 |
| JP | 09-017184 | 1/1997 |
| JP | 09-050822 | 2/1997 |
| JP | 2000-058116 | 2/2000 |
| JP | 2000-058117 | 2/2000 |
| JP | 2001-015155 | 1/2001 |

(Continued)

OTHER PUBLICATIONS

Jong-Ho Jeon, May 2006, Korea, KR 2006-41429, machine translation.*

(Continued)

*Primary Examiner*—Dah-Wei D Yuan
*Assistant Examiner*—Edu E Enin-Okut
(74) *Attorney, Agent, or Firm*—Stein McEwen, LLP

(57) ABSTRACT

Aspects of the present invention relate to an electrolyte for a high voltage lithium rechargeable battery and a high voltage lithium rechargeable battery employing the electrolyte, and more particularly to an electrolyte for a high voltage lithium rechargeable battery comprising a non-aqueous organic solvent; a lithium salt; and a combination of a halogenated biphenyl and a dihalogenated toluene used as an additive where the combined additive has an oxidation reduction potential of 4.6 to 5.0 V with respect to lithium. The lithium rechargeable battery employing the electrolyte for a high voltage lithium rechargeable battery achieves overcharge stability.

22 Claims, 2 Drawing Sheets

FOREIGN PATENT DOCUMENTS

| | | |
|---|---|---|
| JP | 2003-272701 | 9/2003 |
| JP | 2005-135906 | 5/2005 |
| KR | 2006-29748 | 4/2006 |
| WO | 2005/008829 | 1/2005 |
| WO | 2005/075535 | 8/2005 |
| WO | WO 2005076403 A1 * | 8/2005 |
| WO | 2006/009206 | 1/2006 |

OTHER PUBLICATIONS

English Translation of Office Action issued by State Intellectual Property Office of China in Chinese Patent Application No. 200710148009.7 on Apr. 3, 2009.

* cited by examiner

ELECTROLYTE FOR HIGH VOLTAGE LITHIUM RECHARGEABLE BATTERY AND HIGH VOLTAGE LITHIUM RECHARGEABLE BATTERY EMPLOYING THE SAME

CROSS-REFERENCE TO RELATED APPLICATIONS

This application claims the benefit of Korean Application No. 2006-100962, filed Oct. 17, 2006, in the Korean Intellectual Property Office, the disclosure of which is incorporated herein by reference.

BACKGROUND OF THE INVENTION

1. Field of the Invention

Aspects of the present invention relate to an electrolyte for a high voltage lithium rechargeable battery and a high voltage lithium rechargeable battery employing the electrolyte; aspects of the present invention relate more particularly to an electrolyte for a high voltage lithium rechargeable battery which includes a halogenated biphenyl and dihalogenated toluene used as additives where the additives have an oxidation reduction potential relative to lithium of 4.6 to 5.0 V, as well as a high voltage lithium rechargeable battery that has overcharge stability.

2. Description of the Related Art

Recently, as portable electronics, such as camcorders, cellular phones and laptop computers have become widespread in daily life and as electronic appliances have been miniaturized and lightened due to the rapid development of technology in the electronics, network and computer industries, consumers require light, durable and reliable batteries more and more. In particular, lithium rechargeable batteries have an energy density per unit weight three times as much as those of conventional lead-acid storage, nickel-cadmium, nickel-metal hydride and nickel-zinc batteries. Furthermore, a lithium rechargeable battery can be recharged rapidly. Consequently, lithium rechargeable batteries have been studied and developed throughout the world.

In the lithium rechargeable battery, a lithium metal oxide is used as a positive electrode active material, and a lithium metal, lithium alloy and carbon or carbon composite are used as a negative electrode active material. A lithium rechargeable battery is classified as a lithium ion, lithium ion polymer or lithium polymer battery according to the type of the electrolyte used therein, and it is classified as a cylinder type, polygonal type or coin type battery according to the shape of the battery.

In a lithium rechargeable battery, the most important problem is ensuring the physical security of the battery during operation. In particular, a lithium ion rechargeable battery reaches an overcharged state when it is charged over the designed level, for example due to a malfunction in the charging control circuit. Then lithium ions are pulled out of the positive electrode and moved to the negative electrode, where lithium ions are both occluded in the negative electrode and precipitated on the surface of the negative electrode. In this state, if the battery continues to be charged, then the internal resistance of the battery increases because of the movement, occlusion and precipitation of the lithium ions. This behavior of the lithium ions is an exothermic reaction, and in the worst case thermal runaway occurs.

To prevent or control the overcharge problem or thermal runaway, a temperature sensing current cut-off switch, for example a PTC (positive temperature coefficient thermistor) to cut off the current, or a means which reduces the charging current upon detection of an internal pressure change in the battery, is generally used. However, the use of a current cut-off mechanism is expensive, and installation of such a mechanical apparatus inside the battery is difficult because of the need for miniaturization of the battery.

For resolving these problems, electrolytes including biphenyls and alkyl-benzenes are known from publication patents such as JP 1997-17184, JP 2000-58116, JP 2001-15155 to promote thermal stability as a function of the charging state of the battery. Furthermore, in Japanese publication patent JP 1997-50822 and JP2000-58117, the internal temperature rise can be prevented by adding into the battery an aromatic compound with a methoxy group and halogen group, biphenyl or thiophene, or an aromatic ether compound which polymerize in the overcharged state.

However, when biphenyl (and other additives) are used, at a typical operating voltage, the biphenyl is gradually decomposed during charging/discharging of the battery when relatively high voltage is locally generated, or decomposed when the battery is discharged at high temperatures for long periods, such that overcharge safety cannot be guaranteed after 300 charge/discharge cycles. Additionally, the additives for conventional overcharge protection used in a battery operating at 4.2 V can not ensure the overcharge safety of a high voltage battery (4.4 V system) and can cause deterioration of the reliability of a 4.4 V system.

SUMMARY OF THE INVENTION

One aspect of the present invention is to provide an electrolyte which can ensure overcharge safety of a high voltage battery. Another aspect of the present invention is to provide a high voltage lithium rechargeable battery including the above electrolyte in order to ensure overcharge safety of the battery.

An electrolyte for accomplishing the aforementioned and/or other aspects of the present invention, comprises: a non-aqueous organic solvent; a lithium salt; and a halogenated biphenyl of the following chemical formula 1 and a dihalo-toluene of the following chemical formula 2, which have an oxidation reduction potential relative to lithium of 4.6 to 5.0V:

The chemical formula 1 is:

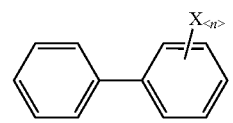

(where, X is a halogen atom, and n is an integer 1 to 3). The compound of chemical formula 1 is preferably 2-fluorobiphenyl.

The chemical formula 2 is:

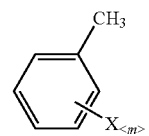

(where, X is a halogen atom, and m is an integer 2 to 4). The compound of chemical formula 2 is preferably 2,5-dichloro-toluene.

The additives are each provided in concentrations of 0.1 to 10% by weight of the non-aqueous organic solvent. The halogenated biphenyl and dihalotoluene are preferably mixed in a weight ratio of 1:1 to 2:3. Since the oxidation potential of the halogenated biphenyl is lower than that of the dihalotoluene, battery performance deterioration can occur when they are added together. Therefore, it is preferable for overcharge protection to increase the amount of the halogenated biphenyl. A halogenated ethylene carbonate, preferably fluorinated ethylene carbonate (FEC, see below), can also be used in an amount of 0.1 to 10% by weight, together with the above overcharge additives.

The oxidation reduction potential refers to the potential at the time when the oxidation reaction is initiated, i.e. the decomposition start voltage. This oxidation reduction potential can be changed according to the type of organic solvent used with the additives, and the oxidation reduction potential according to this aspect of the present invention is the value when the oxidation reduction potential is measured by using a carbonate based solvent as the organic solvent of the electrolyte. That is, if the oxidation reduction potential is measured by using the additives and carbonate based solvent according to the present invention, even when another organic solvent is used in the actual electrolyte, it will satisfy the value. Also, the decomposition start voltage refers to the potential at the time that the current density changes by $0.00001$ A/cm$^2$, where the measurement condition is at atmospheric pressure at the room temperature of 20 to 25° C. Furthermore, the value is measured when the additives are used in concentrations of more than 0.1% by weight of the total electrolyte weight. In cases where the additives used are less than 0.1% by weight of the total electrolyte weight, the peak change of the current sometimes cannot be observed by the naked eye, and thus the method is not preferred for small concentrations of additives.

The additive of the chemical formula 1, which has a relatively high oxidation reduction potential, is polymerized by the oxidation reaction more when subject to overcharge than at 4.6 V, the generated polymer slightly short circuits the positive electrode and negative electrode, and thus the slight polymerization controls the thermal runaway which is caused by the oxidation reaction between the principal component of the electrolyte and the electrode material. Furthermore, the additives to the electrolyte are electro-chemically and thermally very stable, and these stabilities eliminate the adverse side effects of battery deterioration, for example changes in standard capacity, high rate capability and life characteristics. Thus, these additives have additional advantages to the oxidation-polymerization.

In accordance with the second object cited above, another aspect of the present invention provides a high voltage lithium rechargeable battery comprising: a negative electrode; a positive electrode; and a lithium ion rechargeable battery including the electrolyte described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
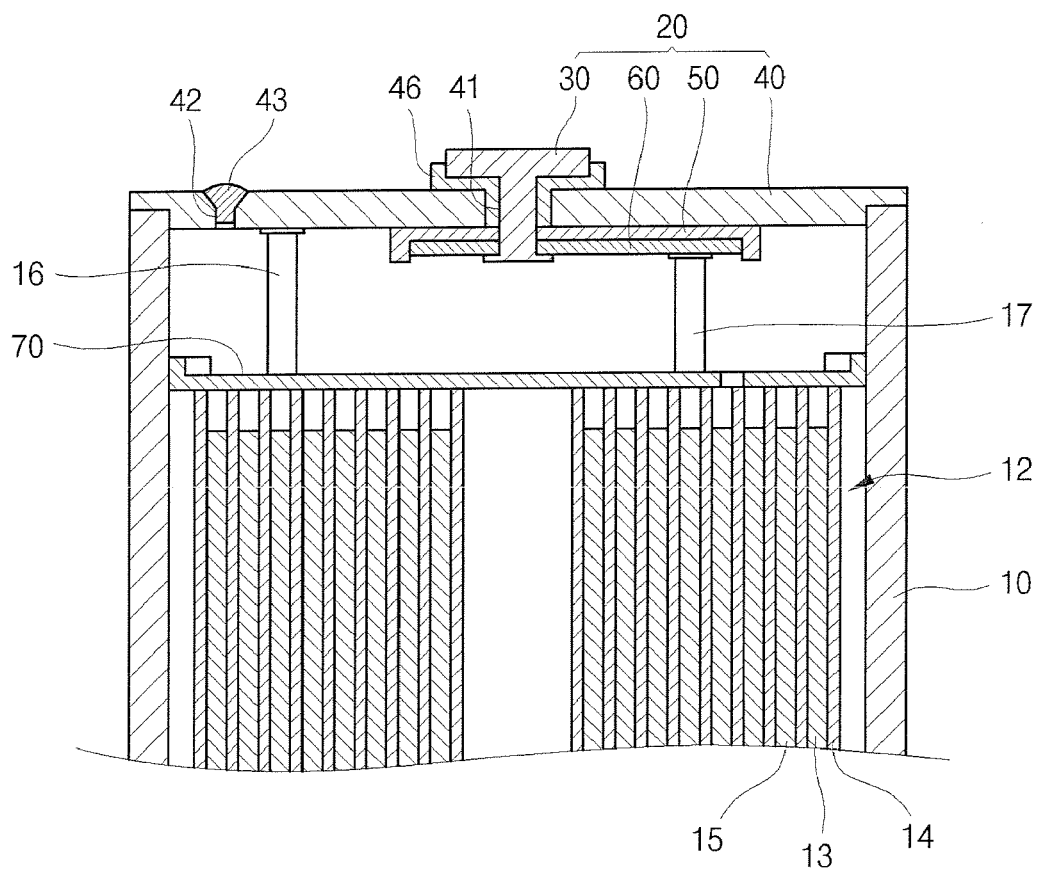
FIG. 1 is a cross-sectional view of a battery including an electrolyte according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

One aspect of the present invention relates to an electrolyte for a high voltage lithium rechargeable battery providing a battery with excellent high temperature storage characteristics and long life.

The electrolyte of this aspect of the present invention, that ensures the overcharge safety of a high voltage battery (4.4 V system), includes a halogenated biphenyl of chemical formula 1 and a dihalotoluene of chemical formula 2 as the additives, which have an oxidation reduction potential between 4.6 to 5.0 V relative to lithium.

The chemical formula 1 is:

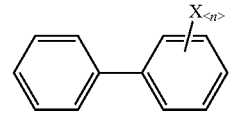

where, X is a halogen atom, and n is an integer 1 to 3.

The chemical formula 2 is:

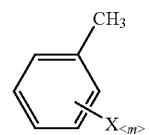

where, X is a halogen atom, and m is an integer 2 to 4.

The conventional overcharge additive, which is used in a 4.2 V system to prevent the battery from overcharging, cannot achieve the necessary overcharge safety for a high voltage battery and can therefore lead to deterioration of the reliability of a 4.4 V system. Therefore, an additive having a decomposition voltage of 4.6 V or more is required in order to achieve the overcharge safety required for a high voltage battery. However, if the decomposition voltage is more than 5 V, then the thermal runaway due to the oxidation reaction between the principal component of the electrolyte and the electrode material occurs before the slight short-circuit resulting from oxidation polymerization of the additives is formed. Therefore, the oxidation reduction potential of the additives is preferably within the range of 4.6 V to 5.0 V in order to achieve the desired reliability and safety of the battery. Moreover, the additives of chemical formula 1 and 2 are preferably mixed and used as the additive having the oxidation reduction potential within the range of 4.6 V to 5.0 V. According to one embodiment of the present invention, it is preferable that 2-fluorobiphenyl and 2.5-dichlorotoluene are used. These additives are each added to the electrolyte in an amount of 0.1 to 10% by weight. It should be noted that the overcharge characteristic of the electrolyte is better when the halogenated biphenyl and the dihalotoluene are used together than when the halogenated biphenyl or the dihalotoluene is used individually.

A halogenated ethylene carbonate can also be used within the range of 0.1 to 10% by weight, together with the other overcharge additives. A compound of the following chemical formula 3, preferably fluoroethylene carbonate (FEC), is used as the halogenated ethylene carbonate. Chemical formula 3 has the structure:

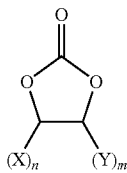

where X is a halogen atom, Y is H or a halogen atom, and n and m are integers 1 or 2). It should be noted that when halogenated ethylene carbonate is used with the halogenated biphenyl and the dihalotoluene, then shortening of the battery life is prevented compared to when just halogenated biphenyl and dihalotoluene are used as the additive.

The electrolyte of this aspect of the present invention further comprises the non-aqueous organic solvent and a lithium salt. The lithium salt act as a supply source of lithium ions in the battery and enable the fundamental operation of the lithium battery. The water insoluble organic solvent acts as a medium through which the ions that are part of the electrochemical reaction of the battery can move.

The lithium salt is, for example, at least one of the lithium salts selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_2$, $LiAlCl_4$, LiCl and LiI. The concentration of the lithium salt is preferably within the range of 0.6 to 2.0 M, and more preferably within the range of 0.7 to 1.6 M. In cases where the concentration of the lithium salt is below 0.6 M, the conductivity of the electrolyte is too low, causing deterioration of the performance of the electrolyte. In cases where the concentration of the lithium salt is over 2.0 M, the viscosity of the electrolyte is too high, reducing the mobility of the lithium ion.

The organic solvent can include a carbonate, ester, ether or ketone, or mixtures thereof. The organic solvent must have high permittivity (polarity) and low viscosity so as to improve the conduction of the ion by increasing the degree of dissociation of the ion. Thus it is preferable that the solvent mixture be composed of one solvent having high permittivity/viscosity and another solvent having low permittivity/viscosity.

For the carbonate based solvent, it is preferable that a cyclic carbonate and a chain carbonate are mixed and used therein. In this case, the cyclic carbonate and chain carbonate are preferably mixed and used together within the range of 1:1 to 1:9 by volume, and more preferably they are mixed and used together within the range of 1:1.5 to 1:4 by volume. The desired performance of the electrolyte is accomplished only when the carbonate-based solvents are mixed at these volume ratios.

Ethylene carbonate (EC), propylene carbonate (PC), 1,2-butylene carbonate, 2,3-butylene carbonate, 1,2-pentylene carbonate, 2,3-pentylene carbonate and so on can be used as the cyclic carbonate. Ethylene carbonate and propylene carbonate are preferable due to high permittivity. When artificial graphite is used as the negative electrode active material, ethylene carbonate is preferable. Dimethyl carbonate (DMC), diethyl carbonate (DEC), dipropyl carbonate (DPC), methylpropyl carbonate (MPC), ethylmethyl carbonate (EMC), ethylpropyl carbonate (EPC) and so on can be used as the chain carbonate. Of these, dimethyl carbonate, ethylmethyl carbonate and diethyl carbonate are preferable.

Methyl acetate, ethyl acetate, propylacetate, methyl propionate, ethyl propionate, γ-butyrolactone, γ-valerolactone, γ-caprolactone, δ-butyrolactone, ε-caprolactone and so on can be used as the ester. Tetrahydrofuran, 2-methyltetrahydrofuran, dibutylether and so on can be used as the ether. Methylvinyl ketone can be used as the ketone.

The electrolyte of the present invention can further comprise an aromatic hydrocarbon solvent dissolved in the carbonate-based solvent. As the aromatic hydrocarbon solvent, a compound of the following formula 4 can be used.

[the chemical formula 4]

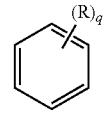

In the chemical formula, R is a halogen or alkyl group of 1-10 carbon atoms, and q is an integer 0 to 6.

Specific examples of the aromatic hydrocarbon solvent include benzene, fluorobenzene, bromobenzene, chlorobenzene, toluene, xylene, mesitylene and so on can be used. They can be used alone, or mixed and used together. In the electrolyte including the aromatic hydrocarbon solvent, it is preferable that the volume ratio of the carbonate solvent to the aromatic hydrocarbon-based organic solvent be within the range of 1:1 to 30:1. The desired performance of the electrolyte is preferably accomplished only when the solvents are mixed at these volume ratios.

The lithium rechargeable battery including the electrolyte of the present invention is provided with a positive and negative electrode. The positive electrode includes a positive active material which is able to accept or release lithium ions, the positive active material being composite oxides with lithium and at least one metal selected from the group consisting of cobalt, manganese and nickel. The following lithium containing compounds are preferably used:

 (1)

 (2)

 (3)

 (4)

 (5)

 (6)

 (7)

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_a \quad (10)$$

$$Li_xNi_{1-y-z}Co_yM_zO_{2-a}X_a \quad (11)$$

$$Li_xNi_{1-y-z}Mn_yM_zA_a \quad (12)$$

$$Li_xNi_{1-y-z}Mn_yM_zO_{2-a}X_a \quad (13)$$

where, $0.9 \leq x \leq 1.1$, $0 \leq y \leq 0.5$, $0 \leq z \leq 0.5$ and $0 \leq a \leq 2$; M and M' can be the same or different from each other and are selected from the group consisting of Mg, Al, Co, K, Na, Ca, Si, Ti, Sn, V, Ge, Ga, B, As, Zr, Mn, Cr, Fe, Sr, V and rare earth elements; A is selected from the group consisted of O, F, S and P; and X is selected from the group consisting of F, S and P.)

The negative electrode includes a negative active material which is able to accept or release lithium ions, and the negative active material includes lithium metal, lithium alloy, or a carbon material such as crystalline carbon, amorphous carbon, carbon composition, carbon fiber, and so on. Examples of non-crystalline carbon include hard carbon, coke, mesophase pitch-based carbon fiber (MPCF), mesocarbon microbead (MCMB) calcined below 1500° C., etc. Examples of crystalline carbon include graphite-based materials, and more specifically natural graphite, graphitized coke, graphitized MCMB, graphitized MPCF, etc. It is preferable that the carbon material has a d002 interplanar distance of 3.35-3.38 Å, and an Lc (crystallite size) of at least 20 nm as determined by X-ray diffraction. The lithium alloy can be an alloy of lithium and aluminum, zinc, bismuth, cadmium, antimony, silicon, lead, tin, gallium or indium.

The positive or negative electrode can be produced by the steps of: dispersing the electrode active material, binder, conductive material if necessary, and thickener in a solvent so as to produce an electrode slurry composition and then applying this slurry composition onto the current electrode collector. Aluminum and aluminum alloys can be used as the positive electrode, and copper and copper alloys can be used as the negative electrode. The positive and negative electrode collector can be used in various forms such as foil, film, sheet, punched item, porous item and foamed item, etc.

A binder is needed to give the active material adhesive and cohesive properties, for example, to bind the particles within the active material with each other, to bond the active material to the current collector, and to act as a buffer against the expansion and shrink of the active material. Examples of a binder include polyvinylidenefluoride, a copolymer of polyhexafluoropropylene-polyvinylidenefluoride (P(VdF/HFP)), polyvinylacetate, polyvinylalcohol, polyethyleneoxide, polyvinylpyrrolidone, alkylated polyethyleneoxide, polyvinylether, polymethylmethacrylate, polyethylacrylate, polytetrafluoroethylene, polyvinylchloride, polyacrylonitrile, polyvinylpyridine, styrene-butadiene rubber, acrylonitrile-butadiene rubber, etc. The ratio of the binder content to the electrode active material content is 0.1 to 30% by weight, preferably 1 to 10% by weight. If the content of the binder is too low, then the adhesive force between the electrode active material and the current collector is insufficient. If the content of the binder is too high, then the adhesive force is increased but the content of the electrode active material is decreased by a similar amount, which is unfavorable for increasing the battery capacity.

The conductive material is intended to improve electron conductivity. Examples of a conductive material include at least one material selected from the group consisting of a graphite-based conductive agent, a carbon black-based conductive agent and a metal or metal compound-based conductive agent. Examples of a graphite-based conductive agent include artificial graphite, natural graphite and so forth. Examples of a carbon black-based conductive agent include acetylene black, ketjen black, denka black, thermal black, channel black and so forth. Examples of a metal or metal compound-based conductive agent include tin, tin oxide, phosphoric acid tin ($SnPO_4$), titanium oxide, potassium titanate, $LaSrCoO_3$, and perovskite material such as $LaSrMnO_3$. However, the conductive materials are not limited to those described above. The ratio of the conductive agent content to the electrode active material content is preferably 0.1 to 10% by weight. If the content of the conductive agent is lower than 0.1% by weight, then the electrochemical characteristic of the active material is reduced, and if the content of the conductive agent is higher than 10% by weight, then the energy density per weight is reduced.

The thickener can be anything which controls the viscosity of the active material slurry. Examples include carboxymethyl cellulose, hydroxymethyl cellulose, hydroxyethyl cellulose, hydroxypropyl cellulose, etc.

A non-aqueous solvent or aqueous solvent is used as the solvent in which the electrode active material, binder and conductive material are dispersed. Examples of the non-aqueous solvent are N-methyl-2-pyrrolidone (NMP), dimethylformamide, dimethylacetamide, N,N-dimethylaminopropylamine, ethyleneoxide, tetrahydrofuran and so on.

The lithium rechargeable battery can comprise a separator preventing shut-down between positive electrode and negative electrode and providing an ion moving path. Examples of the separator include one or more polyolefin-based membranes such as polypropylene, polyethylene, polyethylene/polypropylene, polyethylene/polypropylene/polyethylene, polypropylene/polyethylene/polypropylene and so; microporous film; porous polyolefin film coated with stable resin; woven fabric; and non-woven fabric.

Referring now to the figures, FIG. 1 is a cross-sectional view of a rectangular shape battery according to one embodiment of the present invention in FIG. 1, the lithium rechargeable battery is formed by providing an electrode assembly 12 composed of a positive electrode 13, negative electrode 15 and separator 14, together with an electrolyte in a can 10, and then sealing the upper end of the can 10 with a cap assembly 20. The cap assembly 20 is composed of a cap plate 40, insulating plate 50, terminal plate 60 and electrode terminal 30. The cap assembly 20 is connected to an insulating case 70 so as to seal the can 10.

The electrode terminal 30 is inserted into the cap assembly 20 through a hole 41 formed in the center of the cap plate 40. When the electrode terminal 30 is inserted into the cap assembly 20 through the hole 41, a tube shaped gasket 46 is also inserted into the hole 41, connected to the outer surface of the electrode terminal 30, in order to insulate the electrode terminal 30 from the cap plate 40. After assembling the cap assembly 20 into the upper end of the can 10, the electrolyte is injected through an electrolyte injecting hole 42 and the electrolyte injecting hole 42 is then sealed by a plug 43. The electrode terminal 30 is connected to the negative electrode tap 17 of the negative electrode 15 and to the positive electrode tap 16 of the positive electrode 13, so as to act either as the negative electrode terminal or positive electrode terminal.

The lithium rechargeable battery of the present invention is not limited to the shape of FIG. 1, and of course it is apparent that the battery can be any type of shape, for example, a cylinder, a pouch shape and so on, if it includes positive electrode active materials and is able to be operated as a battery.

Hereinafter, the preferable embodiments will be illustrated with experimental results. However, it would be appreciated by those skilled in the art that changes might be made in these embodiments of the present invention without departing from the principles and spirit of the present invention, the scope of which is defined in the claims and their equivalents.

EXAMPLE 1

A positive electrode slurry was manufactured by mixing $LiCoO_2$ as the positive electrode active material, polyvinylidene fluoride (PVDF) as the binder and carbon as the conductive agent at a ratio of 92:4:4 by weight, and by dispersing them in N-methyl-2-pyrrolidone. The positive electrode was manufactured by coating the slurry on 20 μm aluminum foil, and by drying and rolling the slurry-foil combination. A negative electrode active material slurry was manufactured by mixing artificial graphite as the negative electrode active material, styrene-butadiene rubber as the binder and carboxymethyl cellulose as the thickener at a ratio of 96:2:2 by weight, and by dispersing them in water. The negative electrode was manufactured by coating the slurry on 15 μm copper foil, and by drying and rolling the slurry-foil combination.

A film separator 20 μm thick made of polyethylene was inserted between the electrodes, and the positive electrode-separator-negative electrode combination was inserted into a rectangular can. The lithium rechargeable battery was manufactured by inserting electrolyte into the rectangular can. The electrolyte was manufactured by dissolving 1.15M $LiPF_6$ in a mixed solvent of ethylene carbonate/ethylmethyl carbonate/diethyl carbonate (at a ratio of 1:1:1 by volume), to which 2-fluorobiphenyl to 1% by weight and 2,5-dichlorotoluene to 3% by weight thereinwere added. The battery made by this procedure was charged to a voltage of 4.4 V and 0.5 C (current) for 3 hours.

Embodiment 2

The rechargeable battery was manufactured by the same procedure as Example 1 except that the electrolyte was made by adding 2-fluorobiphenyl to 2% by weight and 2,5-dichlorotoluene to 3% by weight.

EXAMPLE 3

The rechargeable battery was manufactured by the same procedure as Example 1 except that the electrolyte was made by adding 2-fluorobiphenyl to 1% by weight, 2,5-dichlorotoluene to 3% by weight and fluoroethyl carbonate to 3% by weight.

EXAMPLE 4

The rechargeable battery was manufactured by the same procedure as Example 1 except that the electrolyte was made by adding 2-fluorobiphenyl to 2% by weight, 2,5-dichlorotoluene to 3% by weight and fluoroethyl carbonate to 3% by weight therein.

EXAMPLE 5

The rechargeable battery was manufactured by the same procedure as Example 1 except that the electrolyte was made by adding 2-fluorobiphenyl to 4% by weight, 2,5-dichlorotoluene to 5% by weight and fluoroethyl carbonate to 3% by weight therein.

COMPARATIVE EXAMPLE 1

The rechargeable battery was manufactured by the same procedure as Example 1 except that the electrolyte was made by adding biphenyl (BP) to 1% by weight, cyclohexylbenzene (CHB) to 1% by weight and fluoroethyl carbonate to 3% by weight as the additive. The battery was charged at 0.5 C for 3 hours to a voltage of 4.2V.

COMPARATIVE EXAMPLE 2

The rechargeable battery was manufactured by the same procedure as Example 1 except that the electrolyte was made by adding biphenyl (BP) to 1% by weight, cyclohexylbenzene (CHB) to 1% by weight and fluoroethyl carbonate to 3% by weight as the additive.

COMPARATIVE EXAMPLE 3

The rechargeable battery was manufactured by the same procedure as Example 1 except that the electrolyte was made by adding 2-fluorobiphenyl to 3% by weight, and fluoroethyl carbonate to 3% by weight as the additive.

COMPARATIVE EXAMPLE 4

The rechargeable battery was manufactured by the same procedure as Example 1 except that the electrolyte was made by adding 2,5-dichlorotoluene to 3% by weight and fluoroethyl carbonate to 3% by weight as the additive.

<Room Temperature Life Characteristics>

The batteries manufactured according to Examples 1 through 5 were charged at 1 C/4.4 V CC/CV (constant current/constant voltage), cutoff at 0.05 C at a temperature of 25° C. and cutoff discharged at 1 C CC and 3.1 V. This cycle was repeated 300 times, and then the capacity maintaining rate at room temperature for 300 cycle was calculated by the formula (discharge capacity of 300 cycle/rated capacity of cell)×100. The results are shown in the last column of Table 1, below.

The batteries manufactured according to Comparative Examples 1 through 3 were cutoff charged at 1 C/4.2 V CC/CV, 0.05 C and cutoff discharged at 1 C CC 3.1 V. This cycle was repeated 300 times, and then the capacity maintaining rate (%) of the room temperature 300 cycle was calculated, and the results are listed in the last column of Table 1, below.

<Overcharge Test>

The batteries manufactured according to Examples 1 through 5 were overcharged above the charged state by 1 C/12 V of constant current/constant voltage at a temperature of 25° C. for 2.5 hours. After the state of the batteries was checked, the results were listed in Table 1.

In Table 1, in the column labeled "result of the overcharge," the number before L is the number of batteries tested. The number after L is the grade for overcharge safety as follows: L0: good, L1: leak, L2: smoke (below 200° C.), L3: smoke (over 200° C.), L4: ignition and L5: rupture. That is, for an example result of 5L0, 5L4, 5 batteries were good and 5 batteries were ignited among the ten batteries tested.

TABLE 1

| | Batteries | result of the overcharge | life (300 cycle) (%) |
|---|---|---|---|
| Com. Ex. 1 | 4.2 V | 20L0 | 85 |
| Com. Ex. 2 | 4.4 V | 15L0, 10L4 | 60 |
| Com. Ex. 3 | 4.4 V | 10L0, 10L4 | 80 |
| Com. Ex. 4 | 4.4 V | 8L0, 12L3 | 83 |
| Example 1 | 4.4 V | 20L0 | 72 |
| Example 2 | 4.4 V | 20L0 | 70 |
| Example 3 | 4.4 V | 20L0 | 85 |
| Example 4 | 4.4 V | 20L0 | 83 |
| Example 5 | 4.4 V | 20L0 | 75 |

As shown in Table 1, a high voltage battery, which was manufactured with an electrolyte having 0.1-10% by weight of 2-fluorobiphenyl or 1-10% by weight of 2,5-dichlorotoluene and/or 1-10% by weight of fluoroethyl carbonate to the weight of non-aqueous organic solvent, achieved overcharge safety. On the contrary, batteries manufactured according to Comparative Examples 2 to 4, which were manufactured by the same procedure except that electrolytes having both 2-fluorobiphenyl and 2,5-dichlorotoluene were not used, failed to achieve overcharge safety.

Figure 2A:
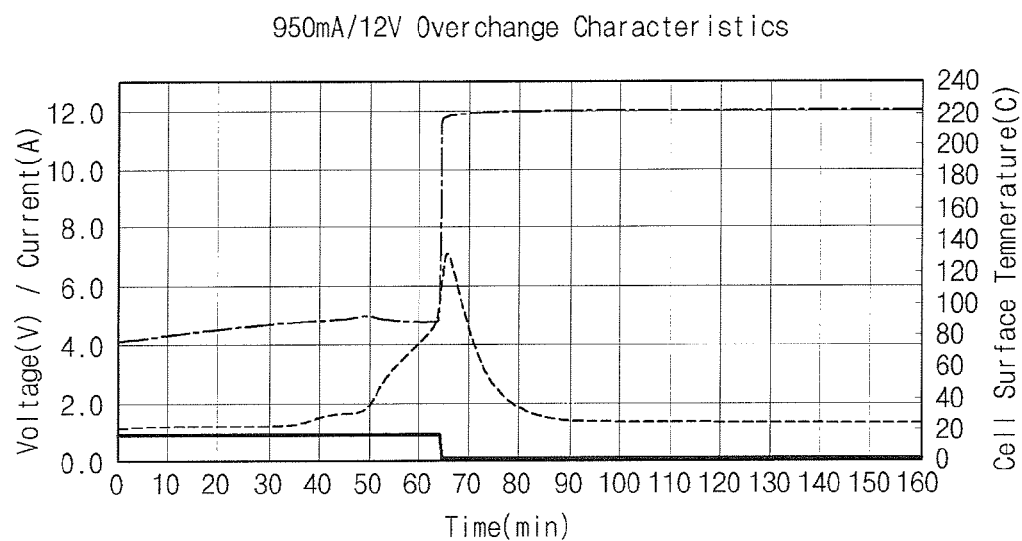
FIG. 2A is a graph describing the change of voltage, current and temperature in the battery along with the time while overcharging the battery at a 12V by 1 C according to Example 1 of the present invention.
Figure 2B:
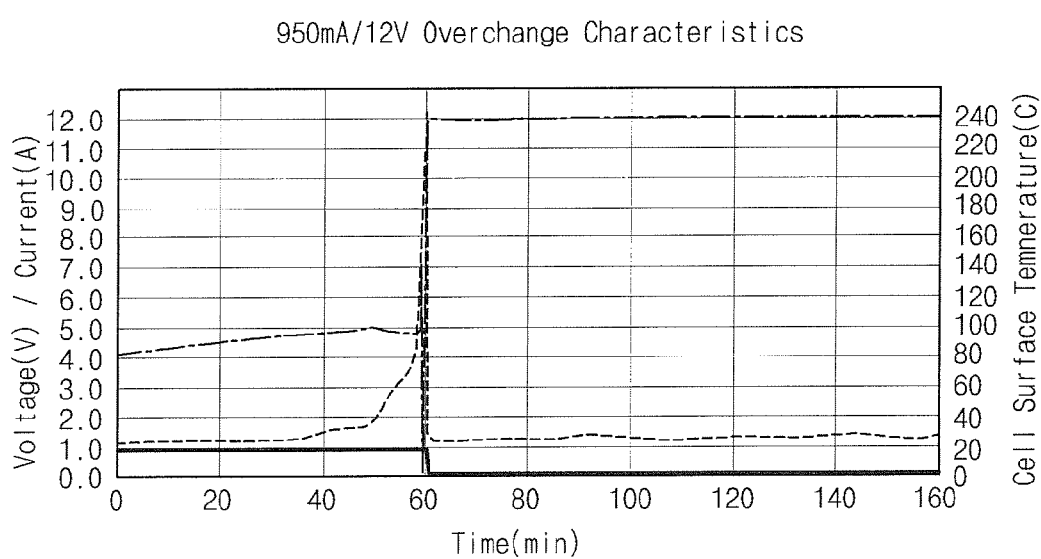
FIG. 2B is a graph describing the change of voltage, current and temperature in the battery along with the time while overcharging the battery at a 12V by 1 C according to the Comparative Example 3 of the present invention.

Furthermore, the batteries manufactured according to Example 1 and Comparative Example 3, were overcharged at 1 C/12 V, and the change of voltage and temperature of the batteries were recorded as a function of time. The results are shown in FIGS. 2A and 2B in FIGS. 2A and 2B, the voltage is denoted by a dashed dotted line, the temperature is denoted by a dotted line, and the current is denoted by a solid line; these symbols are not data points, but ways to differentiate among the lines. As shown in FIG. 2A, the temperature of the battery according to Example 1 increased after 50 minutes. It can be concluded that the additive was oxidized. The temperature of the battery gradually increased, and the voltage was stably maintained at 12 V. On the contrary, with Comparative Example 3 (FIG. 2B), the temperature of the battery drastically increased, and the cell ruptured.

Therefore, as described above, the electrolyte according to embodiments of the present invention provide the excellent lithium rechargeable battery with high overcharge safety.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a high voltage lithium rechargeable battery, comprising:
    a non-aqueous organic solvent;
    a lithium salt; and
    a halogenated biphenyl of the following chemical formula 1 and a dihalotoluene of the following chemical formula 2, which have an oxidation reduction potential with respect to lithium of 4.6 to 5.0 V, wherein:
    chemical formula 1 has the formula,

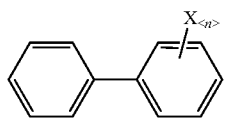

(where, X is a halogen atom, and n is an integer 1 to 3,)

chemical formula 2 has the formula,

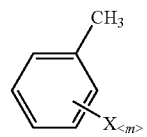

(where, X is a halogen atom, and m is an integer 2 to 4,)

the compound of chemical formula 1 is 2-fluorobiphenyl, and the compound of chemical formula 2 is 2,5-dichlorotoluene.

2. The electrolyte for a high voltage lithium rechargeable battery according to claim 1, wherein the compound of chemical formula 1 and the compound of chemical formula 2 are each provided in an amount of 0.1 to 10% by weight of the non-aqueous organic solvent.

3. The electrolyte for a high voltage lithium rechargeable battery according to claim 1, wherein the electrolyte further comprises a halogenated ethylene carbonate of the following chemical formula 3:

the formula 3:

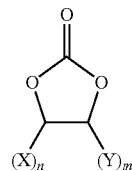

(where, X is a halogen atom, Y is H or a halogen atom, and n and m are each integers 1 or 2,).

4. The electrolyte for a high voltage lithium rechargeable battery according to claim 3, wherein the halogenated ethylene carbonate of chemical formula 3 is provided in an amount of 1 to 10% by weight of the non-aqueous organic solvent.

5. The electrolyte for a high voltage lithium rechargeable battery according to claim 3, wherein the halogenated ethylene carbonate of chemical formula 3 is fluoroethylene carbonate.

6. The electrolyte for a high voltage lithium rechargeable battery according to claim 1, wherein the non-aqueous organic solvent includes at least one solvent selected from the group consisting of a carbonate, an ester, an ether and a ketone.

7. The electrolyte for a high voltage lithium rechargeable battery according to claim 6, wherein the carbonate is a mixture of a cyclic carbonate and a chain carbonate.

8. The electrolyte for a high voltage lithium rechargeable battery according to claim 7, wherein the cyclic carbonate is at least one solvent selected from the group consisting of ethylene carbonate, propylene carbonate, 1,2-butylene carbonate, 2,3-butylene carbonate, 1,2-pentylene carbonate and 2,3-pentylene carbonate.

9. The electrolyte for a high voltage lithium rechargeable battery according to claim 7, wherein the chain carbonate is at least one solvent selected from the group consisting of dimethyl carbonate, diethyl carbonate, dipropyl carbonate, methylpropyl carbonate, ethylmethyl carbonate and ethylpropyl carbonate.

10. The electrolyte for a high voltage lithium rechargeable battery according to claim 1, wherein the non-aqueous organic solvent is a mixture of a carbonate-based solvent and an aromatic hydrocarbon-based organic solvent.

11. The electrolyte for a high voltage lithium rechargeable battery according to claim 10, wherein the aromatic hydro carbon-based organic solvent is an aromatic compound of the following chemical formula 4:

the chemical formula 4:

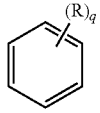

(where, R is a halogen or alkyl group of 1-10 carbon atoms, and q is an integer 0 to 6).

12. The electrolyte for a high voltage lithium rechargeable battery according to claim 10, wherein the aromatic hydrocarbon-based organic solvent is at least one solvent selected from the group consisted of benzene, fluorobenzene, chlorobenzene, bromobenzene, toluene, xylene, mesitylene and mixtures thereof.

13. The- electrolyte for a high voltage lithium rechargeable battery according to claim 10, wherein the carbonate solvent and the aromatic hydrocarbon-based organic solvent are mixed from a ratio of 1:1 through 30:1 by volume.

14. An electrolyte for a high voltage lithium rechargeable battery according to claim 1, wherein the lithium salt is one, or more compounds selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_2$, $LiAlCl_4$, LiCl and LiI.

15. A high voltage lithium rechargeable battery, comprising:
the electrolyte according to claim 1;
a positive electrode having a positive electrode active material which is able to intercalate or de-intercalate lithium ions; and
a negative electrode having a negative electrode active material which is able to intercalate or de-intercalate lithium ions.

16. A high voltage lithium rechargeable battery, comprising:
a positive electrode having a positive electrode active material which is able to accept or release lithium ions;
a negative electrode having a negative electrode active material which is able to accept or release lithium ions; and
an electrolyte further comprising:
a non-aqueous organic solvent;
a lithium salt; and
a halogenated biphenyl of the following chemical formula 1 and a dihalotoluene of the following chemical formula 2, which has an oxidation reduction potential with respect to lithium of 4.6 to 5.0 V, wherein:
chemical formula 1 has the formula,

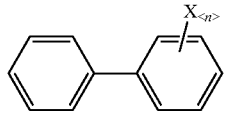

(where, X is a halogen atom, and n is an integer 1 to 3,)
chemical formula 2 has the formula,

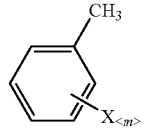

(where, X is a halogen atom, and m is an integer 2 to 4,),
the compound of chemical formula 1 is 2-fluorobiphenyl, and
the compound of chemical formula 2 is 2,5-dichlorotoluene.

17. The high voltage lithium rechargeable battery according to claim 16, wherein the compound of chemical formula 1 and the compound of chemical formula 2 are each provided in an amount of 0.1 to 10% by weight of the non-aqueous organic solvent.

18. The high voltage lithium rechargeable battery according to claim 16, wherein the electrolyte further comprises a halogenated ethylene carbonate of the following chemical formula 3:

the formula 3:

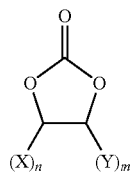

(where, X is a halogen atom, Y is H or a halogen atom, and n and m are each integers 1 or 2,).

19. The high voltage lithium rechargeable battery according to claim 18, wherein the halogenated ethylene carbonate of chemical formula 3 is fluoroethylene carbonate.

20. The high voltage lithium rechargeable battery according to claim 18, wherein the halogenated ethylene carbonate of chemical formula 3 is provided in an amount of 1 to 10% by weight of the non-aqueous organic solvent.

21. The electrolyte for a high voltage lithium rechargeable battery according to claim 1, wherein the battery operates at a voltage of about 4.4 V or higher.

22. The high voltage lithium rechargeable battery according to claim 16, wherein the battery operates at a voltage of about 4.4 V or higher.

* * * * *